April 2, 1935. J. H. FULMER 1,996,700
EXHAUST END CONSTRUCTION FOR HAY CURING CHAMBERS
Filed July 28, 1933 2 Sheets-Sheet 1

J. H. Fulmer
Inventor
By C. A. Snow & Co.
Attorneys.

April 2, 1935. J. H. FULMER 1,996,700
EXHAUST END CONSTRUCTION FOR HAY CURING CHAMBERS
Filed July 28, 1933 2 Sheets-Sheet 2
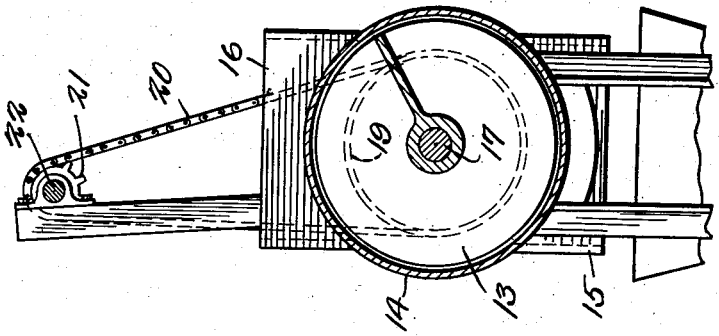
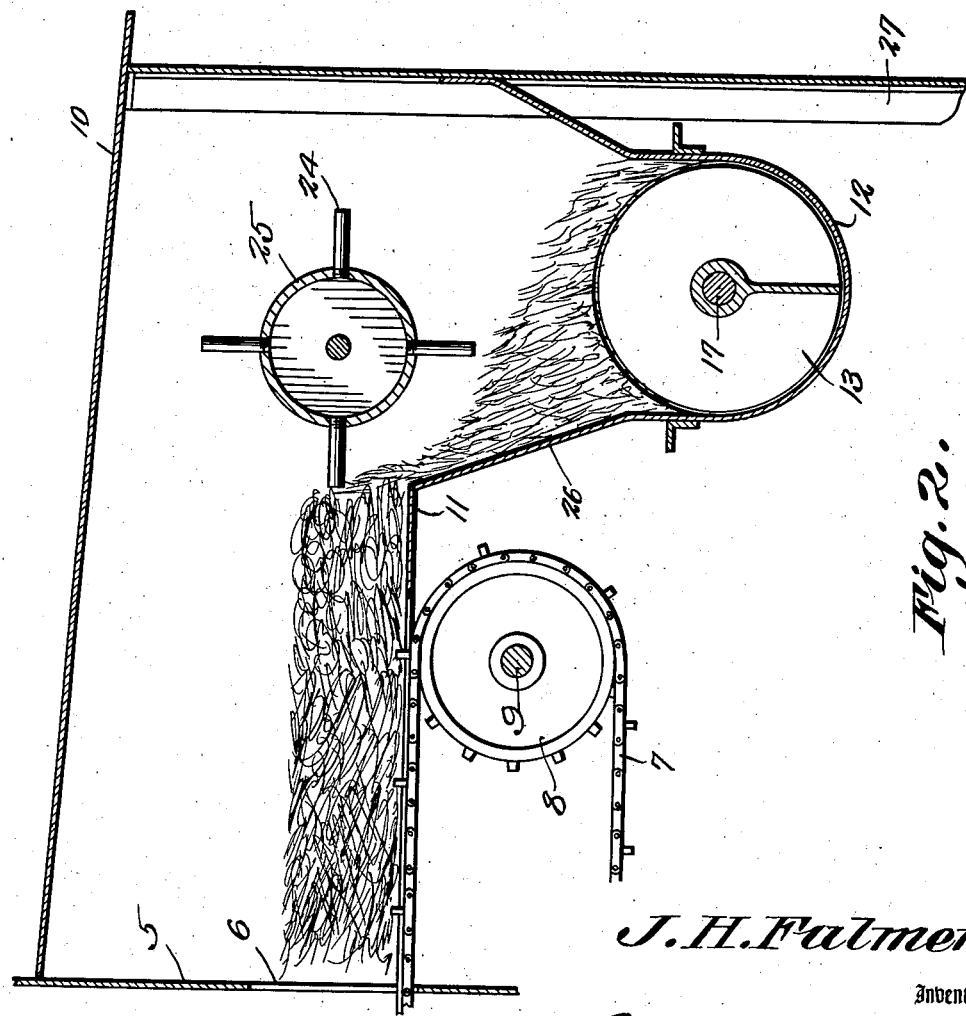

Patented Apr. 2, 1935

1,996,700

UNITED STATES PATENT OFFICE 1,996,700

EXHAUST END CONSTRUCTION FOR HAY CURING CHAMBERS

Joseph Henry Fulmer, Nazareth, Pa.

Application July 28, 1933, Serial No. 682,712

1 Claim. (Cl. 34—12)

This invention relates to machines designed for artificially curing hay or other forage crops, such as shown and described in my pending application for Letters Patent, Serial Number 659,218, filed March 1, 1933, the primary object of the invention being to provide improved means at the discharge end of the curing chamber of the machine for utilizing the hay or material passing through the machine, in sealing the discharge end of the machine, thereby insuring against excessive loss of heat, with the discharge of the cured material from the machine.

An object of the invention is to provide means for loosening the ribbon or mat of dried material so that the material will be forced against the wall of the discharge screw trough, sealing the trough and reducing the loss of heat to a minimum.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view taken on line 2—2 of Figure 1.

Figure 3 is a sectional view taken on line 3—3 of Figure 1.

Figure 1:
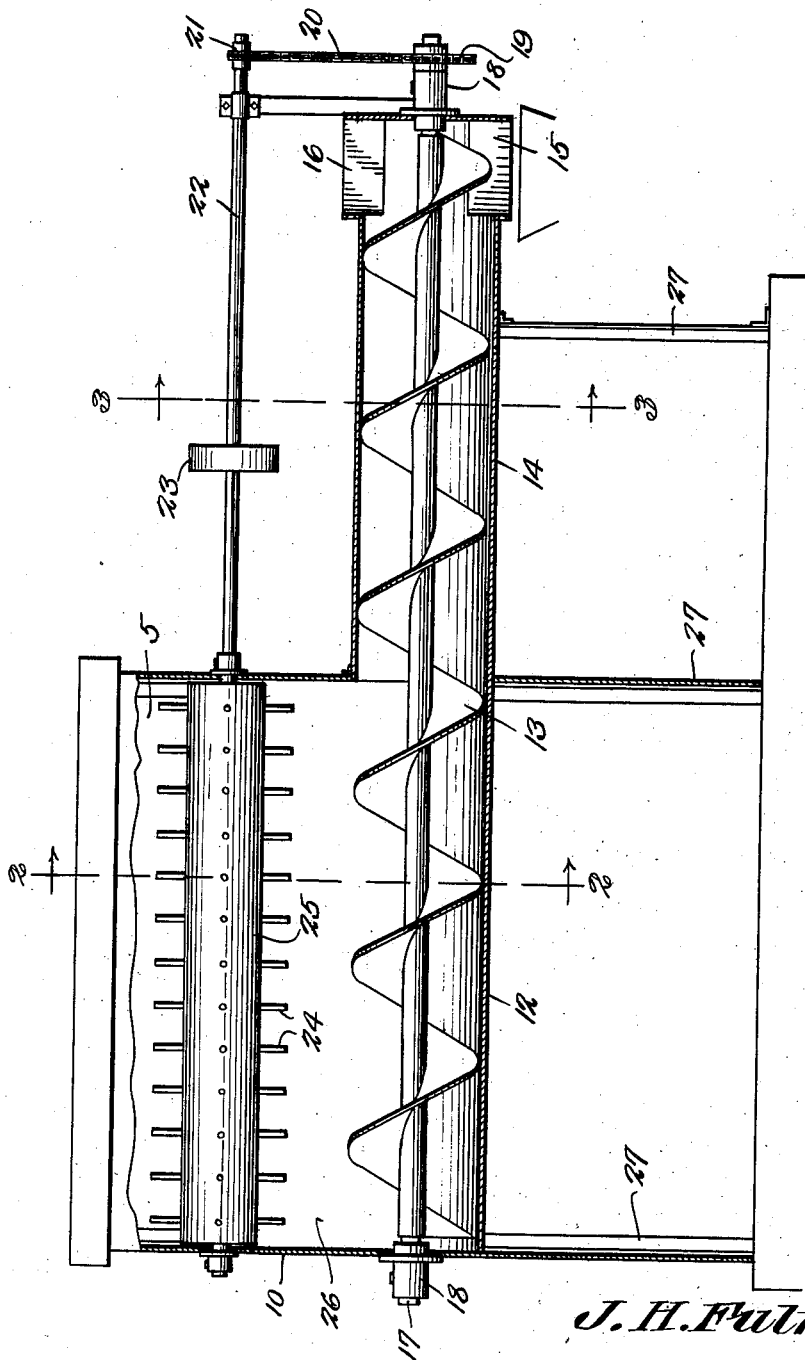
Figure 1 is a transverse sectional view through the discharge end of a curing chamber, constructed in accordance with the present invention.

Referring to the drawings in detail, the reference character 5 designates the end wall of a curing chamber such as shown and described in my pending application, Serial Number 659,218, filed March 1, 1933.

The end wall 5 of the curing chamber, is provided with a discharge opening 6, through which the endless conveyor 7 moves, the endless conveyor operating over sprockets 8, mounted near the ends of the shaft 9.

As clearly shown by Figure 2 of the drawings, a housing indicated generally by the reference character 10 completely houses the discharge end of the conveyor 7, the conveyor extending an appreciable distance into the housing 10.

The housing 10 is formed with a bottom 11, which is curved as at 12, providing a casing for the spiral conveyor 13, which moves in close proximity thereto.

An extension indicated by the reference character 14 forms a part of the bottom, the extension being disposed laterally of the housing 10, and of tubular formation to completely house one end of the spiral conveyor 13.

An opening 15 is formed near the outer end of the extension 14, and provides a discharge opening, through which material passes from the machine.

Directly above the opening 15 is an opening 16 that affords means for venting the discharge end of the machine.

This spiral conveyor is mounted on the shaft 17 that is journaled in bearings 18 supported by the frame of the machine, one end of the shaft carrying a sprocket 19 over which the chain 20 operates, the chain also operating over a substantially small sprocket 21 mounted on one end of the shaft 22 that is supplied with a pulley 23 over which a power belt, not shown, operates.

The bottom 11, is not only offset laterally, but is offset downwardly, so that the spiral conveyor 13 operates at an appreciable distance below the endless conveyor 7, to the end that the material must fall downwardly in its passage to the spiral conveyor.

As the material passes through the curing chamber, the material is formed into a ribbon or mat of uniform thickness, which ribbon or mat is loosened or torn apart, by means of spikes 24 that are carried by the roll 25, mounted on the shaft 22, and disposed within the housing 10.

As clearly shown by Figure 2 of the drawings, these spikes operate in close proximity to the downwardly inclined wall 26 of the bottom, so that the material will be pulled apart and carried downwardly to be carried off by the spiral conveyor 13.

It might be further stated, that due to the construction shown and described the spiral conveyor operates slowly, to discharge the material from the machine gradually.

As the material passes to the spiral conveyor, the material is forced against the wall of the trough in which the spiral conveyor operates, completely sealing the trough, and preventing the heat forced into the curing chamber from passing directly through the machine, with a great loss of heat.

The housing in which the spiral conveyor is mounted, is supported by means of the supports 27, that may be of any desired construction.

Having thus described the invention what is claimed is:

The combination with a hay curing oven having an offset end portion disposed below the bottom of the curing oven, the bottom of the offset portion being curved throughout its length, the side walls of the offset portion being inclined towards the curved bottom, a worm conveyor operating within the curved bottom and adapted to scrape the curved bottom, a laterally extended discharge tube forming a continuation of the curved bottom, said tube having a discharge opening near the outer end thereof, and said tube having a ventilating opening above the discharge opening, said worm conveyor operating through the tube and adapted to convey material laterally from the oven, a roll operating above the worm conveyor, and spikes extending from the roll and adapted to cooperate with one edge of the bottom adjacent to the offset portion in tearing loose the material passing to the worm conveyor.

JOSEPH HENRY FULMER.